US010235205B2

(12) United States Patent
Srinivasa (10) Patent No.: US 10,235,205 B2
(45) Date of Patent: Mar. 19, 2019

(54) REMOTE MANAGEMENT OF DISTRIBUTED DATACENTERS

(75) Inventor: Balaji Srinivasa, Belmont, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1485 days.

(21) Appl. No.: 13/480,333

(22) Filed: May 24, 2012

(65) Prior Publication Data

US 2013/0318242 A1 Nov. 28, 2013

(51) Int. Cl.
*G06F 9/50* (2006.01)
*H04L 9/32* (2006.01)
*H04L 29/06* (2006.01)

(52) U.S. Cl.
CPC .......... *G06F 9/5011* (2013.01); *H04L 9/3268* (2013.01); *H04L 29/06319* (2013.01)

(58) Field of Classification Search
None
See application file for complete search history.

(56) References Cited

U.S. PATENT DOCUMENTS

| 7,171,668 | B2 | 1/2007 | Molloy et al. |
| 7,747,707 | B1* | 6/2010 | Peiffer .................... H04L 69/16 709/217 |
| 7,765,286 | B2 | 7/2010 | Mark |
| 7,860,961 | B1 | 12/2010 | Finkelstein et al. |
| 7,890,951 | B2 | 2/2011 | Vinberg et al. |
| 8,116,207 | B2* | 2/2012 | Schekochikhin ... H04L 43/0817 370/241 |
| 8,151,107 | B2* | 4/2012 | Song .................... G06Q 20/367 705/65 |
| 8,250,570 | B2 | 8/2012 | Suorsa |
| 8,514,868 | B2 | 8/2013 | Hill |
| 8,843,616 | B2* | 9/2014 | Ochoa .......................... 709/203 |
| 2002/0147974 | A1 | 10/2002 | Wookey |
| 2003/0233385 | A1 | 12/2003 | Srinivasa et al. |
| 2003/0233431 | A1 | 12/2003 | Reddy et al. |
| 2003/0233571 | A1 | 12/2003 | Kraus et al. |
| 2005/0137920 | A1 | 6/2005 | O'Connor et al. |
| 2006/0143350 | A1* | 6/2006 | Miloushev ............ G06F 9/5016 710/242 |

(Continued)

FOREIGN PATENT DOCUMENTS

| EP | 1772803 A2 | 4/2007 |
| EP | 1786142 A1 | 5/2007 |
| WO | WO2012/100092 A2 | 7/2012 |

*Primary Examiner* — Azizul Choudhury
(74) *Attorney, Agent, or Firm* — Banner & Witcoff, Ltd.

(57) ABSTRACT

A cloud-based management system for distributed datacenters provides remote management of the datacenters from terminals at various locations. A virtual cloud-based operating system facilitates a transparent system call architecture, permitting subscribers to deploy, configure and manage operations at machines operating on different local operating systems. The virtual operating system can canonicalize available resources into a namespace to expose the resources as files at terminals. Asynchronous execution of subscriber commands across a group of target machines is provided with a notification procedure to control bandwidth and resource allocation. A file distribution model without a central controller for a group of target machines is provided to alleviate interaction with the management cluster for file distribution.

16 Claims, 7 Drawing Sheets

(56) References Cited

U.S. PATENT DOCUMENTS

| | | |
|---|---|---|
| 2007/0239700 A1 | 10/2007 | Ramachandran |
| 2008/0104217 A1 | 5/2008 | Srinivasa et al. |
| 2009/0282404 A1 | 11/2009 | Khandekar et al. |
| 2010/0027552 A1* | 2/2010 | Hill .................. H04L 12/66 370/401 |
| 2010/0042720 A1 | 2/2010 | Stienhans et al. |
| 2010/0088150 A1 | 4/2010 | Mazhar et al. |
| 2010/0106656 A1 | 4/2010 | Sheth et al. |
| 2010/0161965 A1 | 6/2010 | Solin et al. |
| 2010/0169477 A1* | 7/2010 | Stienhans ............ G06F 9/5083 709/224 |
| 2010/0228750 A1 | 9/2010 | Solin |
| 2010/0306354 A1* | 12/2010 | DeHaan ................ G06F 1/3203 709/222 |
| 2010/0333116 A1* | 12/2010 | Prahlad ............... G06F 17/3002 719/328 |
| 2011/0138025 A1 | 6/2011 | Kobi et al. |
| 2011/0179141 A1* | 7/2011 | Ravichandran ........ G06Q 10/06 709/218 |
| 2011/0231899 A1 | 9/2011 | Puller et al. |
| 2011/0238805 A1 | 9/2011 | Signori |
| 2011/0293096 A1 | 12/2011 | Reilly et al. |
| 2011/0296499 A1 | 12/2011 | Knjazihhin et al. |
| 2012/0102160 A1 | 4/2012 | Breh et al. |
| 2012/0110185 A1* | 5/2012 | Ganesan ............... G06F 9/5072 709/226 |
| 2012/0271949 A1 | 10/2012 | Radhakrishnan et al. |
| 2012/0311568 A1* | 12/2012 | Jansen ................ G06F 9/45558 718/1 |

\* cited by examiner

REMOTE MANAGEMENT OF DISTRIBUTED DATACENTERS

BACKGROUND OF THE INVENTION

Field of the Invention

Embodiments in accordance with the present disclosure relate to computer networks, and particularly to datacenter administration and management over computer networks.

Description of the Related Art

Distributed processing and data storage for many enterprises has become commonplace in recent years. Many organizations and even individuals utilize computing resources distributed across remote locations. Such processing or storage locations are often referred to as datacenters. In their simplest form, datacenters may be located within a local area network for an enterprise and include one or more physical machines. More complicated datacenters may include local or remote virtual machines implemented over one or more physical machines using a virtualization platform or operating system. These virtual machines may be implemented privately for an enterprise and be protected by firewalls in traditional applications. Datacenters may also be implemented in both private and public cloud configurations. The enterprise may operate these datacenters itself or subscribe to services for virtual resources offered by third-party operators of datacenters.

Datacenters may operate using a number of different operating system and virtualization layers as well as different programming interfaces. As enterprises utilize datacenters with different interfaces and platforms, the management of these computing resources becomes more difficult. An enterprise may implement similar functionality across non-homogenous platforms. Typically, such deployment requires specific and tailored programming or manual interaction to meet the interface requirements of different platforms. For example, an administrator of an enterprise may have to manually operate or develop code for a terminal to access different machines for even the simplest operations.

DETAILED DESCRIPTION

A cloud-based management system is provided to facilitate remote management and automation of operations at distributed datacenters across different platforms and interfaces. Monitoring, live management, server templates and automation are provided in various embodiments to facilitate management of physical machines, virtual machines, and machines in both private and public cloud-based infrastructures. A virtual cloud-based operating system facilitates a transparent system call architecture, permitting subscribers to seamlessly deploy, configure and manage operations at machines operating on different local operating systems. In one embodiment, the virtual operating system canonicalizes available resources into namespaces to expose the resources as files at a user terminal. Asynchronous execution of subscriber commands across a group of target machines is provided with a notification procedure to control bandwidth and resource allocation in one embodiment. A file distribution architecture for a group of target machines is further provided without a central controller to alleviate interaction with the management cluster for distribution of resources to a target group of machines.

In one embodiment, a management cluster provides a cloud-based product as a service over one or more public networks such as the internet. A subscriber, which may include a user or enterprise, may establish an account with credentials at the management cluster. The subscriber may link or associate target machines at local or remote datacenters with the subscriber account. In one embodiment, a certificate exchange with subscriber information is instituted on each target machine using an agent provided to the target machine by the management cluster. The agent may execute a certificate exchange with the management cluster so that the machine may be tracked regardless of its physical locations.

The management cluster includes a discovery server that maintains an open connection with each target machine. The agent is configured to issue standard outbound communication protocol requests to the discovery server to maintain persistence. In this manner, no firewall or network changes are required to permit the management cluster to securely communicate with the target machine over public networks using standard communication protocols such as HTTP and HTTPs.

A subscriber may utilize various terminals at different client devices to interface with the management cluster. In one example, scripts and/or libraries may be downloaded to the terminal when the management cluster is accessed, permitting remote access from anywhere without a dedicated terminal deployment or a requirement of client software installation. Subscriber requests for a target machine are routed to the management cluster using standard communication protocols. A management server may receive the requests, and queue or otherwise place them on hold at the management cluster. The management server interfaces with the discovery server to determine whether each target machine is available based on an open connection request from the agent on each target machine. The management server, through the discovery server, instructs the agent to establish a connection to the management or other server, passing an identification of the subscriber request and address of the management server. The agent establishes a connection using an outbound communication protocol request. The management server matches the subscriber request to each agent request and passes the subscriber request to the agent by responding to the agent's outbound request.

Figure 1:
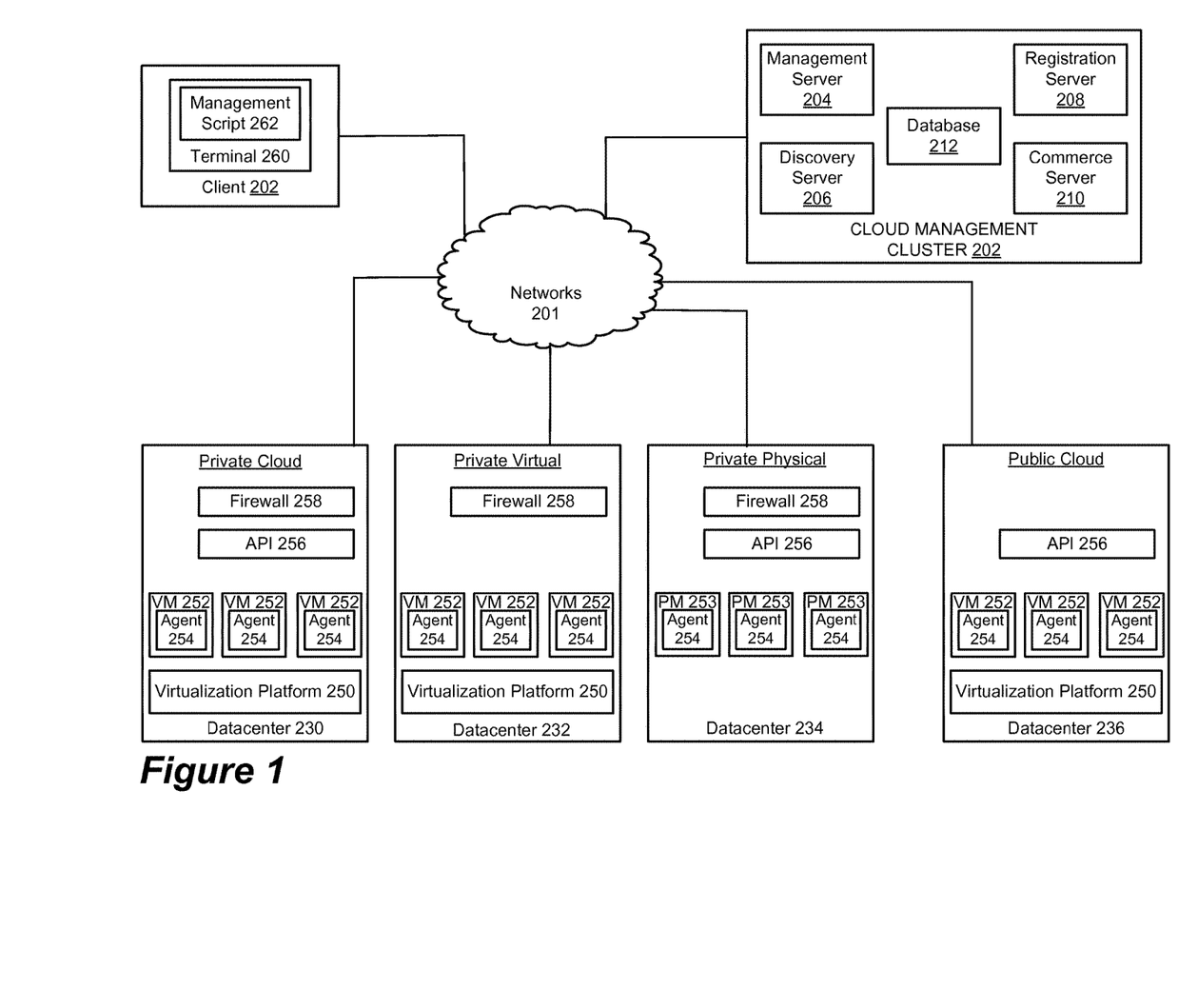
FIG. 1 is a simplified block diagram of a computer network including a management cluster in accordance with one embodiment.

FIG. 1 is a simplified block diagram of a system for cloud-based administration and management of computing devices at remote and distributed datacenters in accordance with one embodiment. A cloud management cluster 202, client device 202, and four distributed datacenters 230, 232, 234 and 236 are in communication with one or more network(s) 201. Although a single client device and four datacenters are depicted, any number of terminals, subscribers and datacenters may be used. Network(s) 201 can include any combination of local area networks, wide area networks (WAN), the Internet, and/or any other network. As will be described with respect to specific embodiments hereinafter, network 201 typically includes at least one public network such as the Internet with the various components communicating using well know communication protocols such as HTTP, HTTPs, etc. The various resource requests as described herein can be transmitted using any number of well-known communication and network protocols. Requests and responses can include a packet, cell, message, or signal used to ask for and receive resources. Some examples include the HTTP communication protocol over a TCP/IP network protocol, HTTPS over SSL, FTP, LDAP, FILE, TELNET, and DATA: URL.

The cloud management cluster 202 includes a management server 204, discovery server 206, registration server 208, commerce server 210 and database 212. Each server may be configured in software, hardware or a combination of software and hardware. Each server may be implemented on one or more physical computing devices. By way of example, suitable computing systems such as servers, groups, grids, distributed platforms of computer systems, personal computers, workstations, mainframes, etc. may be configured as described herein.

A subscriber of services provided by the management cluster provides subscriber information which is stored in database 212. A subscriber may be an individual or an entity such as a corporation, school, or governmental institution. The subscriber may establish an account to permit standard verification and authentication of operations by the management cluster 202. In one example, a web server (not depicted) in conjunction with an application server layer on which the various servers are configured may be included within the management cluster and provide various web pages for receiving subscriber information as well as other operations described herein.

A subscriber of services may use any type of client device and terminal to access the management cluster 202. By way of non-limiting example, terminal 260 may include any number and type of web browsers, command prompts or other applications executing on client devices such as desktops, laptops, mobile devices or any of the machines described with respect to the management cluster and the like. A management script 262 is illustrated at terminal 260 in this example. As described hereinafter, various resources such as web pages or other user interfaces (UI) may be provided by the management cluster in response to user requests. Scripts 262 or other pieces of code may be provided to the client device to facilitate select operations.

FIG. 1 depicts a number of different types of datacenters that may be accessed by a subscriber via management cluster 202. Management cluster 202 permits a subscriber to access any number of datacenters including physical and virtual machines using standard communication protocols and without requiring special router and firewall configurations to permit the management cluster access to those machines. FIG. 1 includes a number of different datacenters 230, 232, 234 and 236, illustrating that provisioning, administering and automating the management process across various types of platforms is handled in the same manner to provide a unified platform to a particular subscriber when dealing with machines in multiple types of environments. Other implementations and subscriber provisions may include fewer or additional types of datacenters than those described.

Datacenter 230 represents a typical private cloud-based datacenter that is configured in a virtualized environment behind a firewall 258. Private cloud datacenters often enable enterprise subscribers to provide hosted services to business units behind firewalls. Access to and usage of these services is generally controlled and tracked. Accounts are created and credentials issued that enable account holders to self-provision their own sets of virtual resources (machines, storage, network) on an "as-needed" basis. Such cloud services—aka Infrastructure-as-a-Service (IaaS)—are typically hosted inside "cloudified" data centers; supply a virtualization layer; and expose an API that enables other software programs to interact with resources on the virtualization layer.

Datacenter 230 includes at least one physical computing device or machine such as a server and at least one storage device such as a disk drive or storage subsystem. The computing device(s) host a virtualization platform 250 which implements multiple virtual machines 252. Virtualization platform 250 may include any suitable operating system for implementing a virtual layer over a physical machine layer. By way of example, virtualization platforms provided by CITRIX CLOUDSTACK, OPENSTACK, VMWARE VCLOUD DIRECTOR, XEN, REDHAT and MICROSOFT may be used. Virtualization platform 250 includes an application programming interface (API) 256 specific to the underlying operating system that specifies how software components communicate. Typically, a datacenter 230 will include tens to thousands of physical servers providing an equal or larger number of virtual machines 250.

Datacenter 232 is a local virtualized computing environment including physical machines on which are configured a number of virtual machines using a virtualization platform 250. Virtualization platform may include the same platforms described for datacenter 230 or other operating systems. Datacenter 234 is a local physical datacenter including physical machines such as servers, desktops, mainframes etc. Datacenters 230-234 represent those that may be directly controlled by an enterprise in typical implementations, having a firewall 258 to provide a secure connection to networks 201.

Datacenter 236 is also a cloud-based datacenter, but unlike datacenter 230 it is public and as with many such datacenters, may not include a firewall between the datacenter network and outside public networks. Some public cloud providers, such as Amazon and Rackspace, have their own proprietary APIs, while others, such as Bluelock, use VMware's vCloud API. Still other public cloud providers and private clouds use open source APIs, such as OpenStack. Management cluster 202 can manage any of these APIs to interact with resources on cloud provider platforms, for example to extract information about machines running in the cloud, to launch and manage instances, and to perform a variety of system management tasks.

Each virtual machine 252 at datacenters 230, 232 and 236 and each physical machine 253 at datacenter 234 are provisioned with an agent 254 from management cluster 202. The agents may be installed automatically on each machine over the network by the management cluster or may be downloaded and installed on the machines by the subscriber, such as where a firewall is present. A subscriber provides credentials (e.g. username/password or key for a key pair) for each machine. Agents may be provided for any type of available operating system. The agents may be implemented in software as one or more scripts, programs, applications, applets or other structure and configured as described herein. Each agent is associated with a subscriber to which the corresponding machine is linked. The agents are preconfigured to perform a number of operations, such as sending requests to the discovery server and receiving requests from the management server. The agents further respond to instructions from the management cluster, such as may be provided by the management server 204 or discovery server 206.

Figures 2, 4:
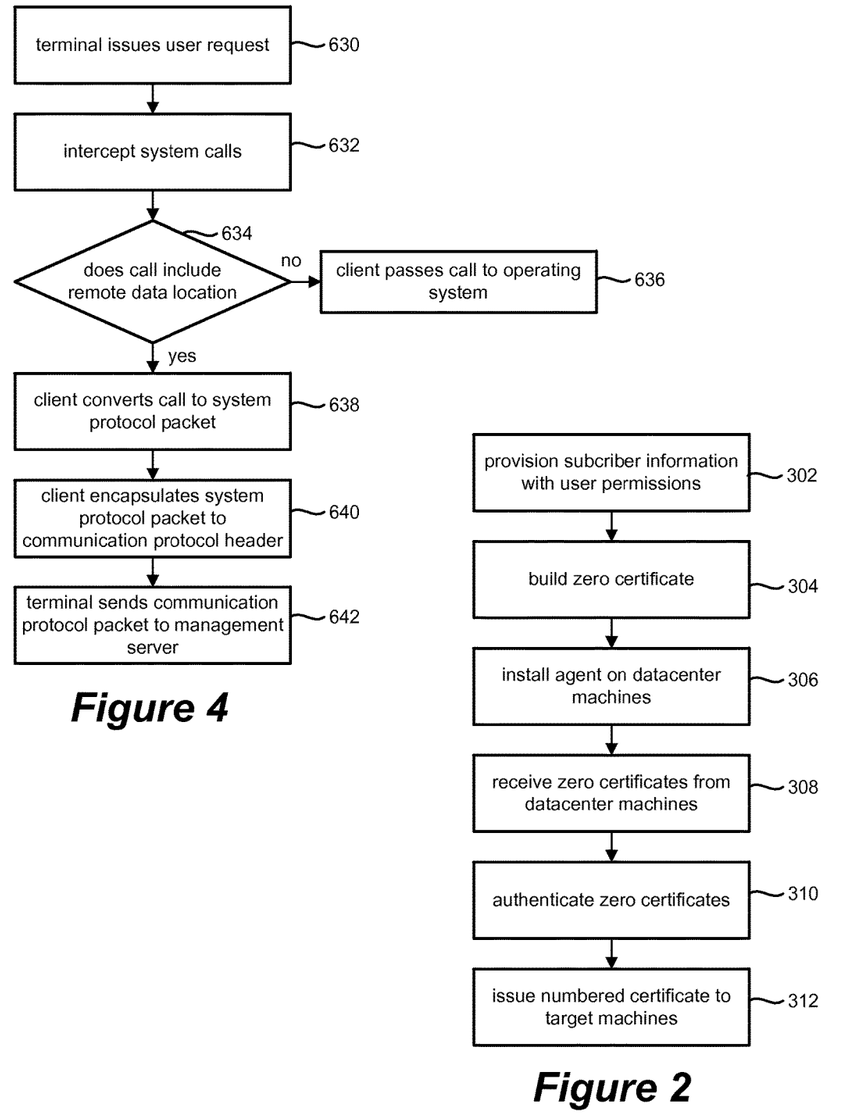
FIG. 2 is flowchart describing a method of provisioning subscriber information and target machines at a datacenter in accordance with one embodiment.
FIG. 4 is a flowchart describing a method of processing a system call at a user terminal in accordance with one embodiment.

FIG. 2 is a flowchart describing a method of establishing a subscriber account at the management cluster and associating one or more target machines with the enterprise. At step 302, the management cluster provisions an enterprise account and associates one or more users with the enterprise. The management cluster may receive enterprise information through one or more form-based web pages in one particular example. The enterprise information can include credentials such as a username and password for different users and roles. An account for a user may be established separate from an enterprise account to permit users to be linked to more than one enterprise. The user can operate in a multi-role fashion, utilizing a single account to manage a set of machines for one enterprise and a second set of machines for a second enterprise. The user credentials may be cross-referenced with enterprise credentials to control user permissions and define different roles. Different permissions may be associated with different roles of the same user. An enterprise may offer multi-tenancy such that more than one user may have management permissions for the enterprise machines. The management cluster provides the ability for different users to be allocated different permissions for the enterprise.

At step 304 the management cluster builds a zero certificate for each target machine in accordance with a subscriber designation. The zero certificate includes information for the corresponding enterprise to link the target machine to the enterprise and/or user. For example, an enterprise or subscriber identifier (ID) may be included in the zero certificate.

At step 306, an agent is installed on each target machine. The agents may be installed with a zero certificate that contains the corresponding enterprise information. Each agent is configured, upon detection of a zero certificate, to generate a request to registration server 208. The registration server authenticates the zero certificates at each machine at step 310, determining from the commerce server 210 whether the enterprise credentials are valid. If the credentials are valid, the registration server responds to the target machine with a numbered certificate for the enterprise that is specific to that machine at step 312.

The agent replaces the zero certificate with the numbered certificate. The numbered certificate permits the management cluster to locate the machine no matter where the machine is located. For example, the management cluster may automatically establish communication with the agent after address information for the machine has been changed. The agent is configured to periodically send a request to discovery server 206 using standard communication protocols. For example, the agent may periodically issue an HTTP or HTTPS request to discovery server 206. The periodic request from the agent allows the discovery server to maintain contact with each provisioned machine, whether or not that machine is protected by a firewall or other access restrictions. Each agent may initiate outbound requests to the discovery server permitting the discovery server to communicate with the agent by a reply corresponding to the request. In this manner, the agent may communicate with the management cluster and maintain persistence even when originating inbound requests to the machine are not permitted by firewall or other network restrictions.

Figure 3:
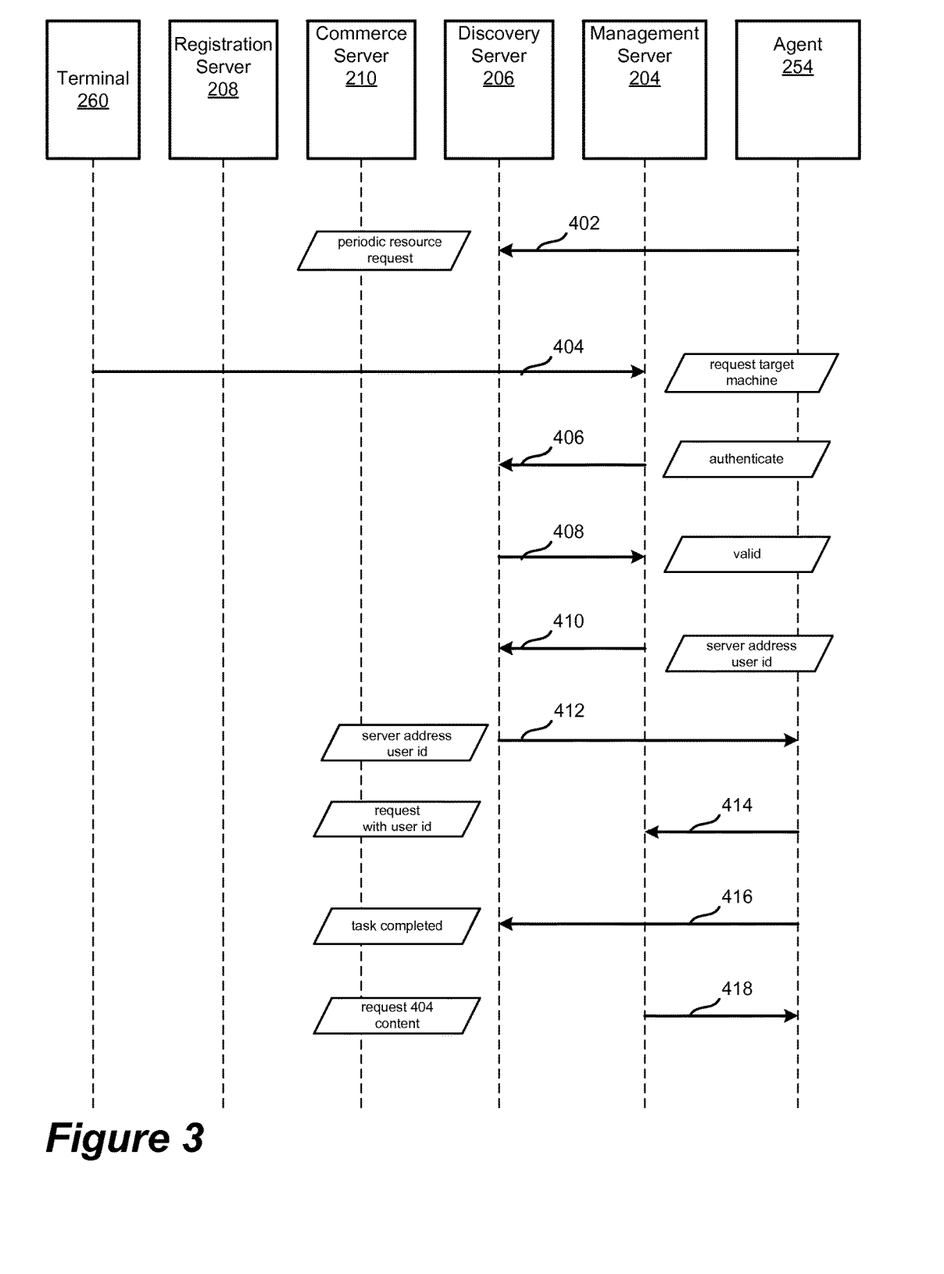
FIG. 3 is a timing diagram depicting traffic between various components of FIG. 1 to establish a connection between a target machine and terminal.

FIG. 3 is a timing diagram depicting communication between the components of FIG. 1 to match a subscriber terminal request with a target machine in accordance with one embodiment. An agent at a machine associated with a subscriber of the management cluster initiates communication with a discovery server at the management cluster as shown at 402. The agent may initiate communication by issuing a request, such as an HTTPs request, to the discovery server. The agent may be configured in one embodiment to periodically issue requests to the discovery server in order to maintain an open connection between the management cluster and each target machine. Because the agent is preconfigured to issue such requests to the discovery server, no changes in existing firewall protections or network protocols have to be made to facilitate management and administration of the target machine by the management cluster, ultimately under control of a subscriber at a terminal. While shown at the beginning of the timing diagram, the agent may issue requests as shown at 402 at any time and during the described processes.

A user, via a terminal such as a web browser, mobile application, etc. issues a request 404 to management server 204. Request 404 may be any standard type of resource request using a communication protocol such as HTTP, HTTPs, etc. In one example, management server 204 includes an application server interfacing with a web server, not shown. The web server may provide a graphical user interface to the user using one or more web pages. For example, a list of machines provisioned for the subscriber's account may be provided in a web page provided to the terminal. The list may indicate a status for each machine based on whether the agent on the corresponding machine has issued a request to discovery server 206 within a threshold time period.

A user may establish a connection to a target machine by selecting one or more machines within the GUI. For example, the user may live browse the filesystem of a target machine by selecting the target machine within the GUI. The user may also establish a connection to a target machine as part of a process ran across a machine or group of machines or as part of file distribution process to a group of machines.

The user request 404 is received at the management server. The management server extracts a user id and/or enterprise id from request 404 to identify the corresponding account(s). The management server authenticates the request, if the user has not been previously authenticated as indicated by a cookie or other identifier, using commerce server 210 as earlier described. If authenticated, the management server 204 generates a unique id for the requested transaction and makes an entry in database 212, indicating the transaction id, user id(s), target machines and the content of the request.

The management server 204 pauses request 404 and passes one or more requests 406 to discovery server 206 for the status of the machine or machines indicated in request 402. For example, management server 204 may determine the numbered certificate of each target machine and pass the certificate number or other unique id to the discovery server. The discovery server determines whether a request 402 is pending from the corresponding agent 254 of the target machine. If a request 402 has been received, the discovery server issues a reply 408 to the management server indicating that the machine is available. In one embodiment, the discovery server implements a threshold period after each request from an agent to open a connection, and if a subsequent request is not received within the period, assumes that the target machine is unavailable.

The management server then issues request 410 to the discovery server 206, including an instruction for agent 254 to establish a connection to a particular server at a particular address of the management cluster. For simplicity, this example assumes that the address is for the original management server 204 but in various embodiments, additional management or processing servers may be implemented to distribute processing. The original management server may balance processing to additional servers by instructing the agent to establish a connection to a particular server for processing the user request. The instruction includes the address of the server to which the agent should establish a connection and the transaction id assigned by the management server.

The discovery server passes the instruction to the target machine as a reply 412 to the outstanding resource request issued by the agent to the discovery server. The agent receives the instruction and extracts the server address and transaction id. The agent then issues an outbound resource request 414 to the management server based on the instruction in reply 412. The request is directed to the address indicated in instruction 412 and includes the transaction id passed in the instruction as well as the target machine's certificate number. The target machine also issues a request 416 to discovery server 206 indicating that the task for reply 412 has been completed.

The management server receives request 414 and extracts the transaction id and certificate number. The management server accesses the database 212 to determine the transaction corresponding to the transaction id. The management server matches request 414 to request 404 based on matching transaction identifiers. The management server then accesses the original request 404 and proxies it to the target machine as a reply 418 to request 414. The instruction in request 404 can be encapsulated into a header or other information returned to the target machine in reply to request 414 as will be described in more detail hereinafter. The agent receives the reply from the management server and extracts the command for execution at the target machine.

In one embodiment, the management cluster provides a cloud-based virtual operating system to facilitate the execution of system calls remotely across target machines. The system calls of native operating systems, or a subset of the system calls, are virtualized to permit system call access to remote data within the actual system call architecture. A set of virtualized system calls can be developed for any type of native operating system. In one example, a set of virtualized system calls can be downloaded to a terminal, for example as management script 262 to provide a browser-based command shell. One or more of the virtualized system calls can replace or be implemented with higher priority over the native system calls at the client device. In one example, the set of virtualized system calls is implemented as a remote processing library on the client device. The remote processing library can be generated by modifying the binary for various native system calls at the terminal. In one embodiment, the modified binaries are provided to the client device. In another embodiment, a script is provided to the client device that can generate the modified binaries. The virtualized system calls can be copies of the native system calls with additional instructions to operate on data at remote locations. The virtualized system calls can be passed to the management cluster for processing as hereinafter described.

The virtual operating system canonicalizes any available resources at the distributed datacenters for presentation to the terminals as files. This architecture permits the resources to be exposed and processed by the terminal in the same manner that a traditional file may be processed. The management cluster canonicalizes available file systems, registries, databases, and other resources for presentation as files to the terminal. In this manner, any code written for a file system can be applied to other namespaces such as registries to achieve the same behavior. This permits the user to use the terminal to access resources virtually so that processes for single or local namespace functions may be applied using the same code for remote distributed resources to achieve similar behavior.

FIG. 4 is a flowchart describing terminal operations in accordance with one embodiment for issuing a user request to one or more target machines using a virtualized system call. The operations of FIG. 4 may be performed by a client application interfacing with the terminal to provide user request 404 of FIG. 3 in one example. At step 630, a terminal issues a user request. The user request may include any type of resource request to perform a target action or access a resource at a target machine as earlier described. At step 632, any system calls in the subscriber request are intercepted by the remote processing library.

At step 634, the remote processing library determines whether any system calls in the request call for remote data. For example, the request may specify a target machine not local to the machine hosting the terminal or may specify a resource or dataset that is hosted remotely by a remote machine. For any system calls that do not call for remote data or processing, the remote processing library passes the call to the local operating system for normal processing at step 636.

For any system calls that specify a remote resource or remote processing, the terminal converts the system call to a system protocol packet at step 638. In one embodiment, the call is converted into a packet in accordance with the 9P system protocol of the Cloud Nine operating system but other type of protocols may be used.

At step 640, the terminal encapsulates the system protocol packet into a communication protocol packet header. For example, the terminal may take a converted binary system protocol packet and perform a base 64 encode to create an encoded packet. This encoded packet can then be embedded into an HTTP header. At step 642, the terminal issues the resource request, such as an HTTP request packet, with the encapsulated system protocol packet to the management server.

As earlier described, the management cluster may receive the user request and in response, initiate or match a connection between the request and an outstanding request from the agent on the target machine. The management cluster may generate a reply to the agent request, passing the communication protocol packet with the encapsulated protocol packet received from the terminal, for example as shown by reply 418 in FIG. 3.

Figures 5, 6, 7:
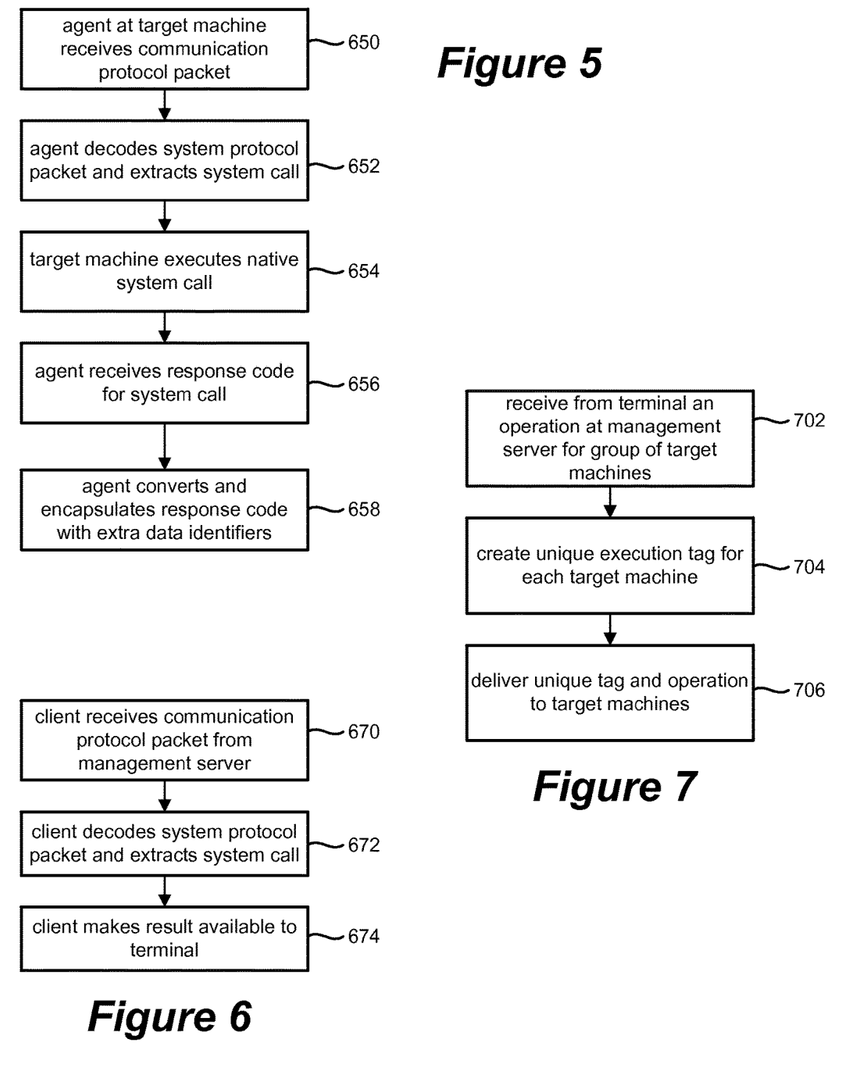
FIG. 5 is a flowchart describing a method of processing a system call by an agent at a target machine in accordance with one embodiment.
FIG. 6 is a flowchart describing a method of processing a system call result at a user terminal in accordance with one embodiment.
FIG. 7 is a flowchart describing a method by the management cluster to institute asynchronous execution of an operation at a group of target machines.

FIG. 5 is a flowchart describing processing by the agent on a target machine after receiving a reply from the management server that passes a subscriber request for remote processing using the virtualized system call architecture. In one example, the process of FIG. 5 can be performed in response to receiving request 418 of FIG. 3.

At step 650, the agent at the target machine receives a communication protocol packet from the management server in response to an initiated resource request having a virtualized system call. The agent decodes the system protocol packet and extracts the system call at step 652. At step 654, the agent converts the system call into the corresponding native system call for the local operating system. The agent then passes the system call to the local operating system. The system call is executed and a response code is returned to the agent with the result of the system call at step 656. At step 658, the agent converts the data result or response code into a system protocol packet and encapsulates the protocol packet into a communication protocol packet header. The agent also adds the transaction id to the packet to identify the transaction the response corresponds to, as well as the certificate number for the target machine to identify where it was processed. The communication protocol packet is then sent as a resource request to the management server. The management server extracts the transaction id and certificate number to determine the corresponding request pending at the management cluster. The management cluster can update a status file in the database to indicate the request for the particular target machine has been completed. The management cluster generates a resource reply to the terminal with the encapsulated system protocol packet in a header.

FIG. 6 is flowchart describing processing by the terminal after the management cluster issues a resource reply with the communication protocol packet generated at step 658 of FIG. 5. At step 670, the terminal receives the communication protocol packet from the management server. The terminal determines the target machine corresponding to the reply from the certificate number in the packet header. The terminal decodes the system protocol packet and extracts the system call and response code at step 672. The terminal converts the response code into a system call packet for the native operating system of the client device. The system call packet is then made available as data by the client application for the terminal which can display the data results at step 674.

In one embodiment, asynchronous execution of operations over a group of target machines is provided by the management cluster. A user can access a shell script for example, or other program, application, or group of code, at a local device, the management cluster or a target machine and cause its execution across a group of target machines asynchronously. The asynchronous process enables the management cluster to pass the transaction to the target machines so that processing at the cluster to manage the operation is minimized. A notification process removes any polling responsibility from the management cluster and user to minimize bandwidth consumption in a cloud-based environment.

FIG. 7 is a flowchart describing processing by the management cluster in one embodiment to begin an asynchronous operation at a group of target devices. At step 702, the management cluster receives from a user terminal a request for an operation across a group of target machines. The operation may include a script or group of scripts, one or more system calls, or other system for execution at the group of target devices. In one specific example, a subscriber can utilize a web browser terminal to select a script or other program for execution at a group of target devices. The subscriber may select a script on a local machine or one already present on one of the accessible target machines or stored by the management cluster. In the case of a script on a local machine, the subscriber may use the GUI to select the script and upload it to storage at the management cluster. The script may be stored in database 212 with information identifying the subscriber.

At step 704, the management server creates a unique execution tag for each target machine. The execution tag for each machine includes information identifying the transaction id of the user request as well as the certificate number for each target machine. At step 706, the management server delivers the unique tag and operation to each target machine. In one example, the tag and operation are delivered together while the unique tag may be delivered separately from the script in other embodiments. More details regarding step 706 are provided hereinafter.

Figure 8:
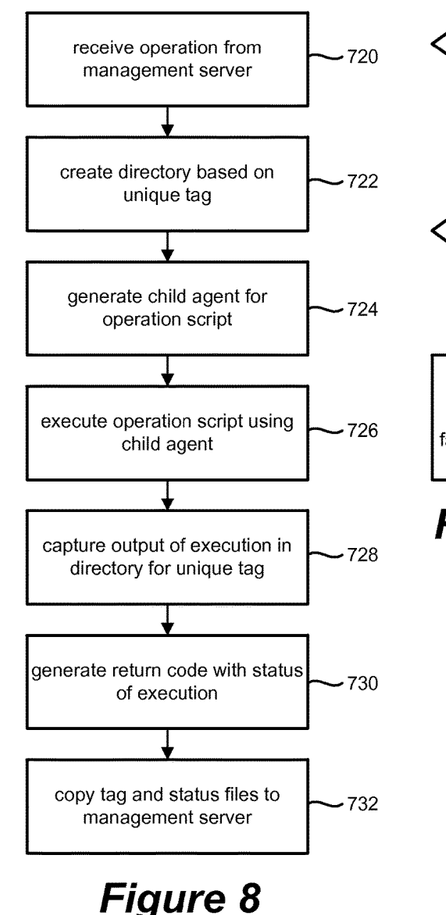
FIG. 8 is a flowchart describing a method by an agent at a target machine to asynchronously execute an operation.

FIG. 8 is a flowchart describing processing by the agent of a target machine in response to the delivery of a unique tag by the management server after receiving a subscriber request for a group of target machines. At step 720, the agent at the target machine receives the operation and the unique tag created for the operation at that target machine. At step 722, the agent creates a directory at the target machine based on the unique tag to enable tracking of the operation at the target machine and by the management cluster. By way of example, the directory in one embodiment is persistent and includes subdirectories CMD, CTRL, OUTPUT, DEBUG and STATUS. The CMD directory includes a specification of the target operation. The CTRL directory contains a control file that is periodically read during the operation to control execution by an agent at the target machine. The control file may be updated during execution, such as by writing a pause, resume or cancel command. The OUTPUT directory contains any output generated by the operation. The DEBUG directory contains files detailing the operation's actual execution at the target machine and the STATUS directory contains files indicating the overall execution status at the target machine. As described hereinafter, these files may be accessed and stored at the management cluster or transferred to a terminal, automatically or in response to a request. These files permit a notification architecture for tracking the operation to alleviate bandwidth consumption as may be expected in a cloud-based system were a polling architecture applied.

At step 724, the agent creates a child agent to manage execution of the operation script at the target machine. The child agent frees the machine agent for additional management processing as may be requested by the management cluster. At step 726, the child agent executes the operation on the target machine in accordance with the included instructions. The child agent accesses the command written in the CMD directory in one example. The child agent captures the output of the script execution in the OUTPUT directory at step 728. At step 730, the child agent generates a return code with the status of the execution and places the code into a status file for the unique tag. At step 732, the child agent copies the unique tag and the status files for the operation execution to the management cluster.

The management cluster utilizes a notification process to audit execution of the operation script across the group of target machines. By utilizing a notification procedure in place of a polling operation, the management cluster avoids unnecessary traffic and bandwidth consumption to determine a result of each execution.

Figure 9:
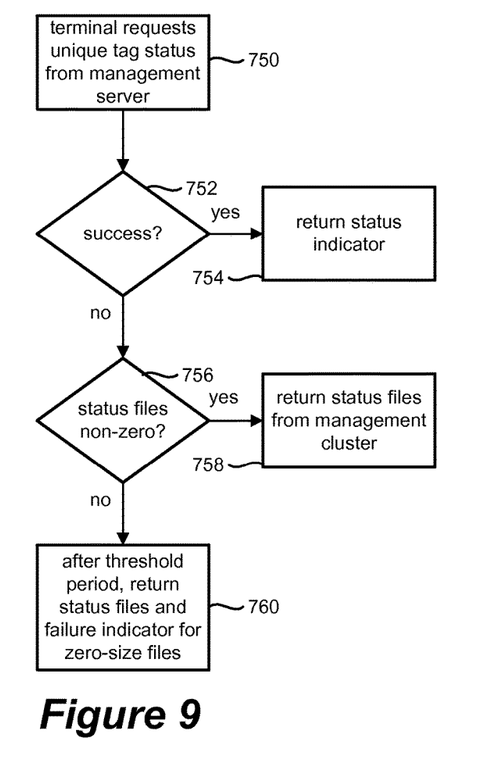
FIG. 9 is a flowchart describing a notification process for an asynchronous operation in one embodiment.

FIG. 9 if a flowchart describing processing by the management cluster to implement a notification operation for auditing the status of an operation across a group of target machines in accordance with one embodiment. At step 750, the management server receives a subscriber request for the status associated with the unique ID of the initial operation. At step 752, the management cluster determines the status associated with the unique tag based on the status files returned to the management server by the agents at each target machine. If each target machine has returned a success response code in its status file, a success status indicator is returned to the terminal at step 754.

If each machine has not returned a success response code, the management server determines whether the size of the status file returned by each target machine is non-zero at step 756. If the size of each status file is non-zero, it indicates that each target machine has returned a status indicator to the management cluster. In this case, the management server reads the status files for each target machine and returns the status files to the terminal at step 758.

If there is no status file for a particular machine or if its status file size is zero, the management server continues to periodically check the status file for a threshold period of time. If the status file size remains zero, the management server assumes that the operation has failed at the target machine. Accordingly, the management server returns the status files for those target machines having a status file, and a failure indicator for the target machines that have not returned a status file at step 760.

It is noted that a subscriber may at any time request the debug, status files directly from any target machine as described above. Further, the management cluster can read the status or other debug files directly from the target machines in one embodiment. For example, if the status file for a target machine remains zero, the management cluster may independently read the status, debug and other files from the target machine for storage at the management cluster.

In one embodiment, the management cluster facilitates a file distribution process that allows partitioning and distribution of file components between the target machines to quickly and efficiently distribute a file using the agents. The management cluster is not actively involved in the file distribution of the file itself, avoiding the need for a centralized controller to manage the distribution process.

Figure 10:
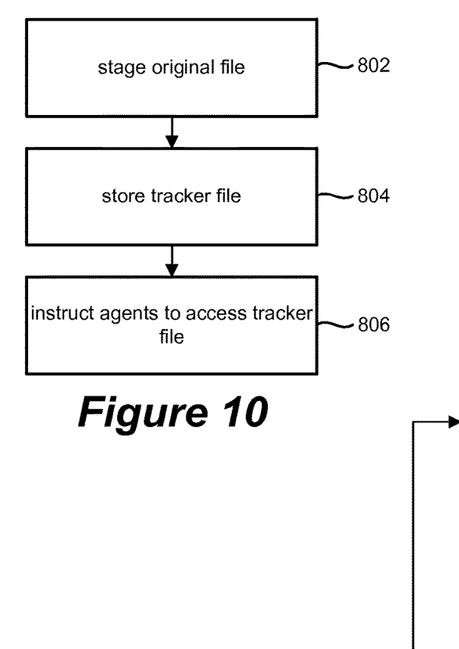
FIG. 10 is a flowchart describing a method by the management cluster to institute file distribution to and between a group of target devices.

FIG. 10 is flowchart describing a process by the management cluster to institute a file distribution process in accordance with one embodiment. At step 802, the management server stages the original file to be distributed. The management server responds to a user request to distribute a file in one example. The file may be stored locally with the user's terminal, at the management cluster or at any target machine associated with the user. The user may provide input through the UI to select a file for distribution in one embodiment. The management server accesses the original file, determines its size and determines a number of file components or pieces to which the original file should be divided. The number of pieces may be based on the number of target machines and file size or other information. The management server then creates a tracker file containing metadata for the distribution process. The tracker file indicates the number of file components, the file name, the file size, a checksum of each file component, the location of the original file and a checksum of the original file in one embodiment.

At step 804, the management cluster stores the tracker file. The tracker file may be stored in the same location as the original file or in any one of the user's client device, the management cluster or one of the target devices. Additionally, the tracker file may be copied to multiple locations by the management server. At step 806, the management server instructs the agents at each target machine to access one of the tracker files.

Figure 11:
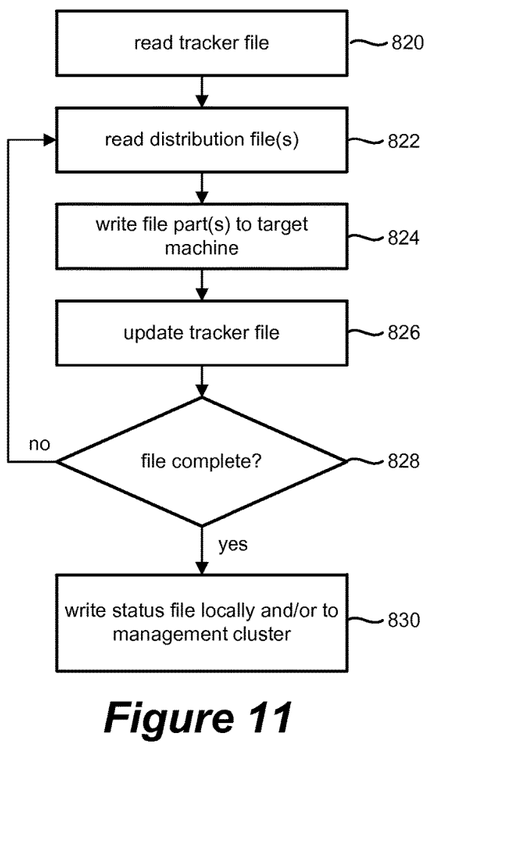
FIG. 11 is a flowchart describing a method by an agent during a file distribution process in accordance with one embodiment.

FIG. 11 is a flowchart describing one embodiment of a process performed by an agent at a target machine in response to a file distribution instruction from the management cluster. At step 820, agent at the target machine reads the tracker file. The agent reads the tracker file using the system call architecture described above in one example. The agent determines the location of the distribution files (e.g., the original file and any already made copy components) and the metadata for completing the file distribution.

At step 822, the agent reads one of the distribution files identified in the tracker file. The distribution file may be a complete copy of the original file or contain only a portion of the file components. Step 822 may include a plurality of parallel reads to multiple distribution files by the agent in one embodiment to more quickly acquire the file. In one embodiment, the tracker file specifies a number of parallel reads or other options for distribution by the agents. If the agent determines that a particular distribution or tracker file is unavailable at step 822, it can automatically access another tracker or distribution file in accordance with the file metadata.

At step 824, the agent writes the file component(s) read in step 822 to the target machine. At step 826, the agent updates the tracker file(s) in accordance with any file components it has obtained. For example, the agent may indicate which components it has by writing to the tracker file so that other agents may utilize the corresponding target machine's copy as a distribution file. Step 826 may also include applying various policies or restrictions on file sharing by a particular machine. For example, a user may enter a policy so that particular machines only consume file distributions but are not available to serve as sources for a distribution file. This may be instituted for sensitive or high usage machines. These policies may also implement time or other restrictions. The management cluster may also set policies for distribution in addition to those set by a user.

At step 828, the agent determines whether it has acquired all components of the distribution file using the metadata from the tracker file. If the file is complete on the target machine, the agent may write to a local status file and/or to the management cluster indicating that the target machine has completed the file acquisition. Step 830 is optional. If the agent determines that the file is not complete, it returns to step 822 to read additional file components from one or more distribution files.

Figure 12:
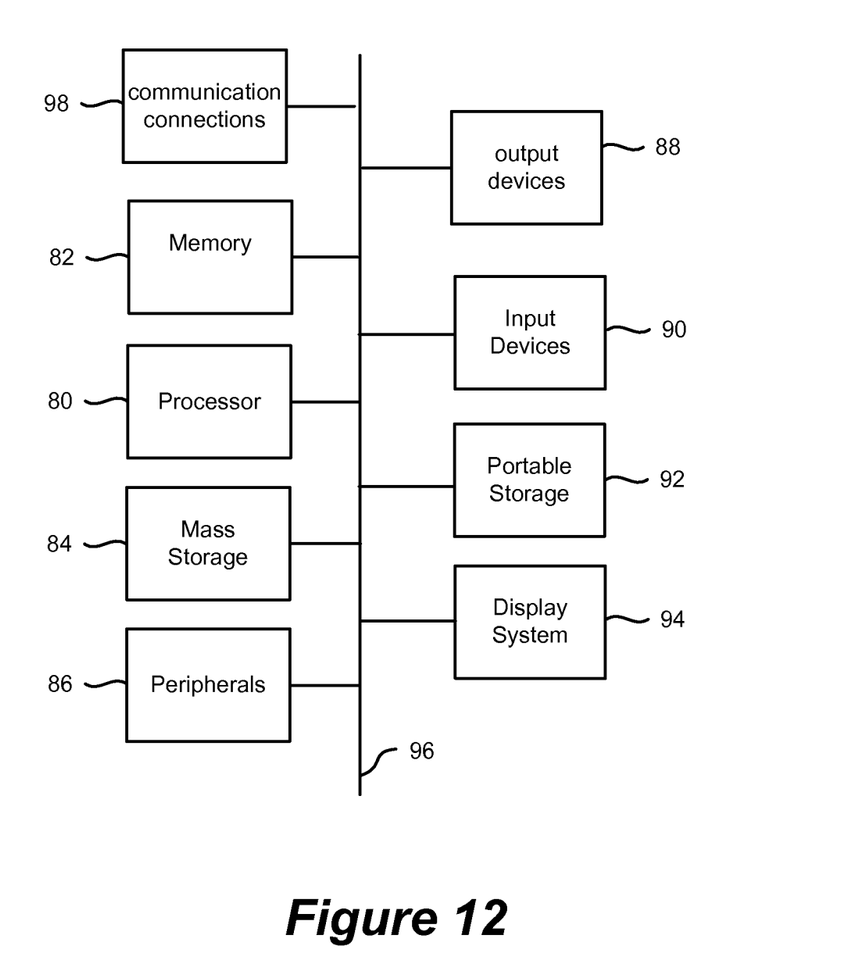
FIG. 12 is a simplified block diagram of a computing device that can be used to implement various embodiments of the disclosed technology.

FIG. 12 is a high level block diagram of a computing system which can be used to implement any of the computing devices of FIG. 1. The computing system of FIG. 12 includes processor 80, memory 82, mass storage device 84, peripherals 86, output devices 88, input devices 90, portable storage 92, and display system 94. For purposes of simplicity, the components shown in FIG. 12 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 12. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 12 will (optionally) have an output display system 94, which may include a video card and monitor. Output devices 88 can include speakers, printers, network interfaces, etc. Device 100 may also contain communications connection(s) 112 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 12 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein can be implemented using hardware, software, or a combination of both hardware and software. The software used is stored on one or more of the processor readable storage devices described above (e.g, memory 82, mass storage 84 or portable storage 92) to program one or more of the processors to perform the functions described herein. The processor readable storage devices can include non-transitory, tangible computer readable media such as volatile and non-volatile media, removable and non-removable media. Tangible computer readable media may be implemented in any method or technology for storage of information such as computer readable instructions, data structures, program modules or other data. Examples of tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other non-transitory, tangible medium which can be used to store the desired information and which can be accessed by a computer. In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more tangible computer readable media/storage devices, peripherals and/or communication interfaces. In alternative embodiments, some or all of the software can be replaced by dedicated hardware including custom integrated circuits, gate arrays, FPGAs, PLDs, and special purpose computers.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method, comprising:
    generating a zero certificate for a plurality of target machines, the zero certificate including information for a subscriber of data management services;
    sending the zero certificate to the plurality of target machines;
    generating a unique certificate for each target machine in response to receiving the zero certificate from an agent at each target machine;
    providing the unique certificate to each corresponding target machine;
    receiving, at a computing device, a first resource request from a computing device associated with a user, the first resource request comprising at least a subscriber identifier of the user, a machine identifier for at least one target machine of plurality of target machines, and instructions for the target machine identified by the machine identifier, wherein the instructions are executable instructions to be executed at the target machine;
    assigning, by the computing device, a transaction identifier to the first resource request;
    receiving, at the computing device, a second resource request from an agent on each target machine of the plurality of target machines, the second resource request comprising at least an indication of availability of each target machine of the plurality of target machines;
    determining, by the computing device and based on the second resource request, availability of the target machine identified by the machine identifier;
    in response to determining that the target machine identified by the machine identifier is available, providing a reply, by the computing device and to the second resource request, the reply to the second resource request comprising at least the transaction identifier assigned to the first resource request and an instruction to the agent on the target machine to send a third resource request to the computing device;

receiving, at the computing device, the third resource request from the agent on the target machine, the third resource request comprising at least the transaction identifier assigned to the first resource request;

matching, by the computing device, the transaction identifier from the third resource request to the transaction identifier assigned to the first resource request; and in response to determining a match, providing a reply to the third resource request, by the computing device, the reply to the third resource request comprising at least the executable instructions for the target machine from the first resource request.

2. The computer-implemented method according to claim 1, further comprising:

receiving, at the computing device, a fourth resource request from the first agent on the first target machine, the fourth resource request comprising at least an output associated with an operation executed at the first target machine specified by the executable instructions and the transaction identifier.

3. The computer-implemented method according to claim 2, further comprising:

in response to receiving the fourth resource request, providing a reply to the first resource request, the reply to the first resource request comprising at least the output data associated with the operation executed at the first target machine.

4. The computer-implemented method according to claim 3, wherein the computing device is a cloud-based server cluster comprising a plurality of servers.

5. The computer-implemented method according to claim 4, wherein the reply to the second resource request further comprises a connection instruction to the first agent on the first target machine.

6. The computer-implemented method according to claim 5, wherein the connection instruction comprises an address of a server in the plurality of servers in the cloud-based server cluster to which the first agent is instructed to send the third resource request.

7. A computer-implemented method, comprising:

generating a zero certificate for a plurality of target machines, the zero certificate including information for a subscriber of data management services;

sending the zero certificate to the plurality of target machines;

generating a unique certificate for each target machine in response to receiving the zero certificate from an agent at each target machine;

providing the unique certificate to each corresponding target machine; sending, by a first agent at a first target machine, a first resource request, the first resource request comprising at least an indication of availability;

receiving, by the first agent at the first target machine, a first reply to the first resource request, the first reply to the first resource request comprising at least a transaction identifier of an operation provided by a computing device associated with a user and an instruction to send a second resource request;

in response to the instruction, sending a second resource request, the second resource request comprising at least the transaction identifier of the operation provided by the computing device associated with the user;

receiving, by the first agent at the first target machine, a second reply to the second resource request, the second reply to the second resource request comprising at least the operation, wherein the operation includes instructions to be executed at the first target machine;

in response to the instructions, relaying the operation to the first target machine to be executed by the first target machine and receiving an output associated with an execution of the operation by the first target machine; and sending, by the first agent at the first target machine, a third resource request, the third resource request comprising at least the output associated with the operation and the transaction identifier of the operation provided by the computing device associated with the user.

8. The computer-implemented method according to claim 7, wherein the output associated with the operation is at least a data result or a response code.

9. The computer-implemented method according to claim 8, further comprising:

converting the output into a system protocol packet; and
encapsulating the system protocol packet into a communication protocol packet header.

10. The computer-implemented method according to claim 7, wherein the second and third resource requests further comprise at least a machine identifier for the first target machine.

11. The computer-implemented method according to claim 7, wherein the first, second and third resource requests are sent as communication protocol packets.

12. The computer-implemented method according to claim 7, wherein the first and second replies are communication protocol packets.

13. The computer-implemented method according to claim 12, further comprising:

decoding the communication protocol packet;
extracting a system call to be performed by the first target machine;
converting the system call into a corresponding native system call for the first target machine; and
passing the native system call to the first target machine.

14. One or more non-transitory computer readable storage media storing executable storing executable instructions that, when executed, cause a computing device to:

generate a zero certificate for a plurality of target machines, the zero certificate including information for a subscriber of data management services;

send the zero certificate to the plurality of target machines;

generate a unique certificate for each target machine in response to receiving the zero certificate from an agent at each target machine;

provide the unique certificate to each corresponding target machine;

receive a first resource request from a computing device associated with a user, the first resource request comprising at least a subscriber identifier of the user, a machine identifier for at least a target machine of the plurality of target machines, and instructions for the target machine identified by the machine identifier, wherein the instructions are executable instructions to be executed at the target machine;

assign a transaction identifier to the first resource request;

receive a second resource request from an agent on each target machine of the plurality of target machines, the second resource request comprising at least an indication of availability of each target machine of the plurality of target machines;

determine availability of the target machine identified by the machine identifier; and in response to determining that the target machine identified by the machine identifier is available, provide a reply to the second resource request, the reply to the second resource request comprising at least the transaction identifier assigned to the first resource request and an instruction to the agent on the target machine to send a third resource request to the computing device;

receive the third resource request from the agent on the target machine, the third resource request comprising at least the transaction identifier assigned to the first resource request;

match the transaction identifier from the third resource request to the transaction identifier assigned to the first resource request; and in response to determining a match, provide a reply to the third resource request, the reply to the third resource request comprising at least the executable instructions for the target machine from the first resource request.

15. The one or more non-transitory computer readable storage media of claim 14, storing further executable instructions that, when executed, cause the computing device to:

receive a fourth resource request from the agent on the target machine, the fourth resource request comprising at least an output associated with an operation executed at the target machine specified by the executable instructions and the transaction identifier.

16. The one or more non-transitory computer readable storage media of claim 15, storing further executable instructions that, when executed, cause the computing device to provide a reply to the first resource request, the reply to the first resource request comprising at least the output data associated with the operation executed at the target machine.

* * * * *